Aug. 9, 1927.
G. HANNAUER ET AL
1,638,630
CONTROL MECHANISM FOR BRAKES
Filed Dec. 20, 1924  2 Sheets-Sheet 2
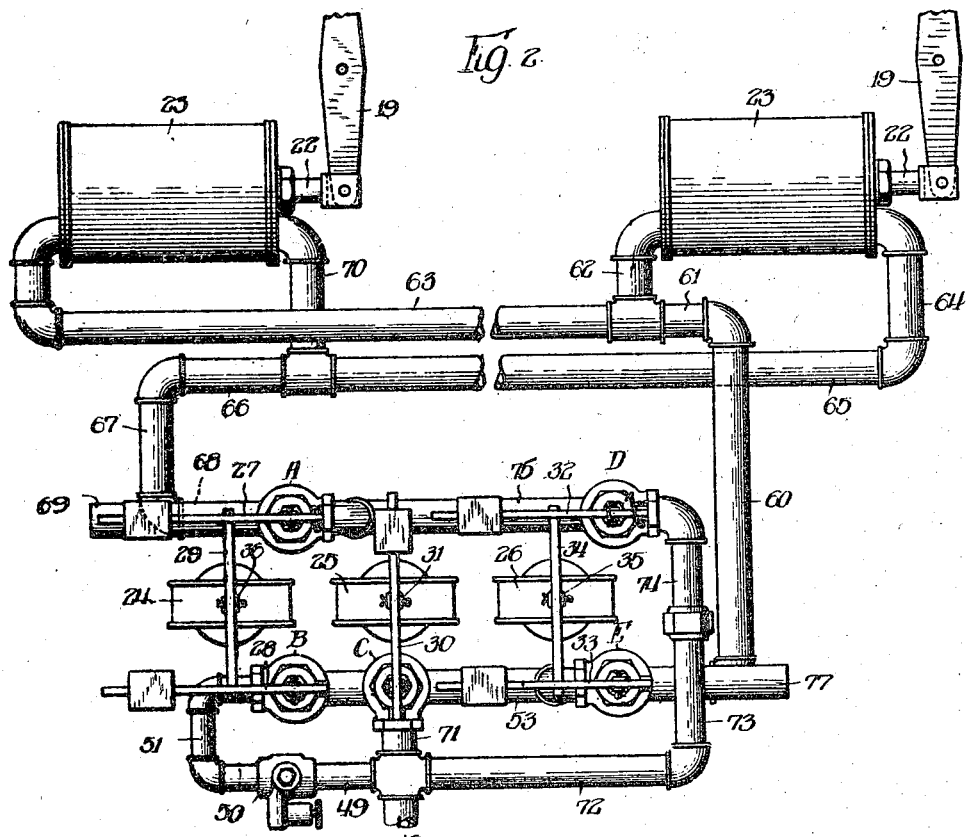
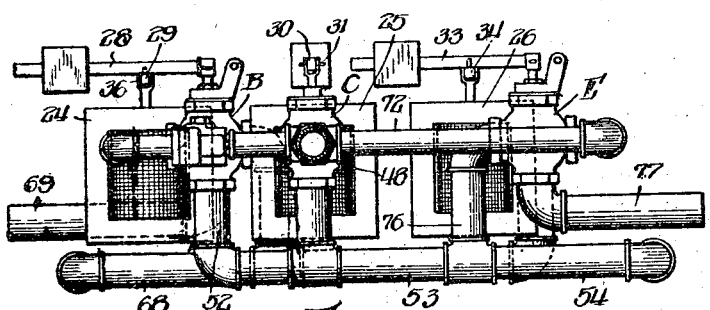
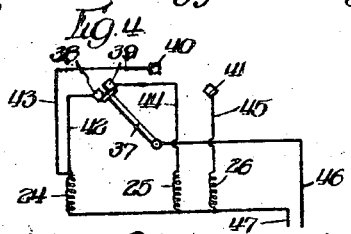
Witness:
A. Burkhardt
Inventors:
George Hannauer,
Edgar M. Wilcox,
By Wilkinson, Huxley, Byron & Knight
Attys.

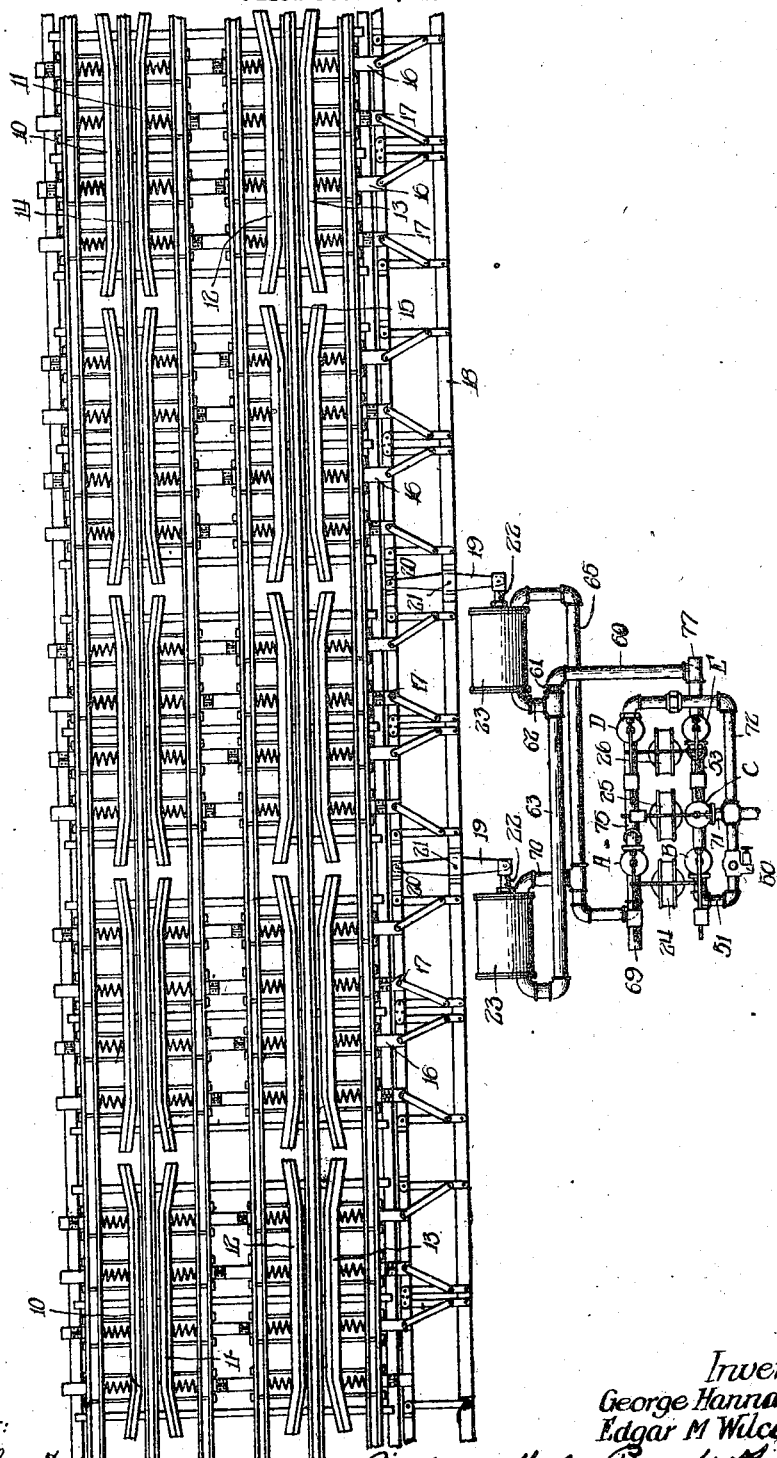

Patented Aug. 9, 1927.

1,638,630

UNITED STATES PATENT OFFICE.

GEORGE HANNAUER AND EDGAR M. WILCOX, OF CALUMET CITY, ILLINOIS, ASSIGNOR TO HANNAUER CAR RETARDER COMPANY, OF CHICAGO, ILLINOIS, A CORPORATION OF ILLINOIS.

CONTROL MECHANISM FOR BRAKES.

Application filed December 20, 1924. Serial No. 757,105.

This invention relates to control mechanism for brakes and more particularly for track brakes.

In our copending application, Serial No. 682,581, filed December 24, 1923, we disclosed a system of track brakes in which the brakes are operated pneumatically and controlled pneumatically from a tower or central station. Such a pneumatic control system requires an extensive piping system to the fluid pressure cylinders to and from the valve control mechanism at the tower. Such piping not only is relatively expensive, but also the waste of air in exhausting through the connections is excessively large. Also in such an extensive piping system the braking and releasing actions of the brakes are not as prompt as is desired.

Accordingly, one object of our present invention is to overcome the above mentioned objectionable features and provide simple, reliable and efficient improved means for controlling the operation of track brakes.

Another object is to provide track brake control mechanism in which a minimum amount of piping is used wherein the loss of actuating fluid is reduced to a minimum and wherein the operating actions are quickly responsive to control movements.

Another object is to provide control mechanism for track brakes whereby the movement of cars may be more accurately controlled and in a manner to meet all of the requirements under the varying service conditions.

These and other objects are accomplished by means of the arrangement disclosed on the accompanying sheets of drawings in which Figure 1 is a top plan view of a system of track brakes and control mechanism therefor embodying our invention.

Figure 2 is a plan view of the same control mechanism on a larger scale;

Figure 3 is a side elevation of the control mechanism shown in Figure 2; and,

Figure 4 is a wiring diagram showing the electrical control mechanism for the valves which in turn control the flow of fluid for operating and releasing the brakes.

The various novel features of the invention will be apparent from the following description and drawings and will be particularly pointed out in the appended claims.

Referring first to Figure 1 of the drawings, it will be noted that the invention is illustrated in connection with track brakes 10, 11, 12 and 13 shown in five sections, track brakes 10 and 11 being mounted on opposite sides of one rail 14 and track brakes 12 and 13 being mounted upon opposite sides of the other rail 15. As fully described in our said copending application, the track brakes 10 and 12 in their brake application movements are yieldably pressed in one direction through spaced transversely arranged members 16 and track brake members 11 and 13 yieldably pressed in the opposite direction through spaced transversely arranged members 17. Said members 16 and 17 respectively are operatively connected to a primary actuating bar 18, also as disclosed in said copending application, said bar in turn being actuated in opposite directions through levers 19 fulcrumed at point 20 and pivotally connected at intermediate point 21 to the bar 18. The other end of each lever 19 is pivotally connected to its cooperating piston rod 22, connected in each case to its associated piston in the cylinders 23.

When the bar 18 is moved to the right as shown in Figure 1, the track brakes will be given braking movements transversely of the rails for engaging opposite sides of wheels and when the bar 18 is moved to the left as viewed in Figure 1, said track brakes will be given a releasing movement. In other words, when the pistons in cylinders 23 are moved to the right, the track brakes will be applied and when the pistons are moved to the left, as viewed in said figure, the brakes will be released.

The flow of fluid to and from opposite ends of the cylinders 23 is controlled by a plurality of main valves A, B, C, D and E. Valves A and B in turn are controlled and actuated through a solenoid 24, valve C by a solenoid 25 and valves D and E by a solenoid 26. Valves A and B are connected respectively to counterweighted levers 27 and 28, which levers are connected to each other by a cross member 29, which in turn is pivotally connected at 36 to the movable member of the solenoid 24, so that when the coil of the solenoid 24 is energized, valves A and B will be moved to open positions to permit a supply of fluid under one pressure to enter, in a manner explained hereinafter, into the left hand end of the cylinders 23 for applying the brakes, fluid being exhausted from the right hand end of said cylinders. The valve C is operatively connected to a counterweighted lever 30 and in turn is pivotally connected at 31 to the movable member of the solenoid 25, so that when the coil of the solenoid 25 is energized, valve C will be opened to permit a supply of fluid under a higher or full pressure to the left hand end of each of the cylinders 23 for applying the brakes with increased pressure. Valves D and E are operatively connected respectively to counterweighted levers 32 and 33, which levers are connected by a cross member 34, in turn pivotally connected at 35 to the movable member of the solenoid 26, so that when the coil of said solenoid is energized, valves D and E will be opened for permitting fluid under full pressure to enter the right hand ends of the cylinders 23, and permitting exhaust from the left hand ends of said cylinders for releasing the track brakes.

Referring for the moment to Figure 4, it will be noted that a diagram of the electrical connections is shown, is being understood that the master controller, including the controller arm 37 and segments 38, 39, 40 and 41 are located at the tower or central station for remote control of valves A, B, C, D and E. Contact 38 is connected to the winding of solenoid 24 by a conductor 42; contact 40 is connected to the same winding of solenoid 24 by another conductor 43; contact 39 is connected to winding of solenoid 25 by a conductor 44; and contact 41 is connected to winding of solenoid 26 by another conductor 45. Controller contact arm 37 is electrically connected to one main 46 of the power circuit, and one end of each of the windings of solenoids 24, 25 and 26 is electrically connected to the other main 47 of the power circuit.

In connection with the operation of the control mechanism and the brakes controlled thereby, if the controller arm 37 is in engagement with contact 40, solenoid 24 will be energized and valves A and B opened thereby. Such results in the flow of fluid from the main supply pipe 48 through pipe 49, reducing valve 50, pipe 51, downwardly through valve B, pipes 52, 53, 54, 60, 61 and 62 to the left hand end of the right hand cylinder 23 and through pipe 63 to the left hand end of left hand cylinder 23 for giving the track brakes a braking movement. At the same time, fluid will be exhausted from the right hand end of the right hand cylinder 23 through pipes 64, 65, 66, 67 and 68, downwardly through valve A and out through exhaust pipe 69. Fluid also will be exhausted from the right hand end of the left hand cylinder 23 through pipes 70 and 66 and connections just described through exhaust pipe 69. It will be understood that the reducing valve 50 may be regulated so that any desired reduction in pressure may be had. Let it be assumed that fluid is supplied through the main pipe 48 at 105 lbs. pressure. The reducing valve 50 may be set to transmit a fluid pressure of any amount under the 105 lbs. pressure, for example, 20 lbs. pressure.

When the controller arm 37 is in engagement with contacts 38 and 39, the windings of the solenoids 24 and 25 will be energized for not only opening valves A and B, but also valve C, whereby not only will fluid flow under the reduced pressure through reducing valve 50 and connections just hereinabove described, but also fluid under full pressure will pass from the supply main 48, pipe 71, down through valve C, pipes 53, 54, 60, 61 and 62 to the left hand side of right hand cylinder, and through pipe 63 to the left hand end of the left cylinder 23 for giving the track brakes an applying movement under full pressure. It will be understood that exhaust from the right hand end of the right hand cylinder 23 will be effected through pipes 64 and 65 and exhaust from the right hand end of the left cylinder 23 through pipe 70, the exhaust from both of said cylinders then passing through pipes 66, 67 and 68 down thru valve A and out through exhaust pipe 69.

The track brakes 10, 11, 12 and 13 are given a releasing movement under full pressure. This releasing action takes place when the controller arm 37 is in electrical contact with segment 41 which causes an energization of the winding of solenoid 26 for opening valves D and E. It will be understood, of course, that when valves D and E are opened, the coils of solenoids 24 and 25 are de-energized and the valves A, B and C accordingly closed. With the valves D and E open, fluid will be applied under full pressure to the right hand ends of the cylinders and fluid will exhaust from the left hand ends thereof. The actuating fluid passes from supply main 48 and then thru pipes 72, 73 and 74, down thru valve D, and thru pipes 75, 68, 67, 66 and thru pipe 70 to the right hand end of the left hand cylinder 23, and thru pipes 65 and 64 to the right hand end of right hand cylinder 23. Fluid from the left hand ends of said cylinders will pass through pipes 62 and 63 respectively and then through pipes 61, 60, 54 and 76 down through valve E and out exhaust pipe 77. Accordingly, with valves D and E open, the pistons in the cylinders 23 will be forced to the left, as viewed in the figures of the drawings, for releasing the track brakes 10, 11, 12 and 13 under full pressure.

If anything, it is more necessary to be able to release the brakes quickly to prevent derailment in case the wheels start to climb the track brakes and leave the rails. Furthermore, it is important that the track brakes should be released quickly to prevent cars coming together in the brakes; for example, let it be assumed that there is a light car and a heavy car disconnected from each other and running through the same system of track brakes; let it be assumed further that the brakes are applied. It will be appreciated that with the same braking pressure, the light car will stop quicker than the heavy car, making it necessary at times to release the light car temporarily, at least, to prevent the heavy car from bumping into the light car and being coupled therewith. It will be understood that the light car and heavy car were separated from each other at the top of the hump purposely because they are to go to different switching tracks in the making up of different trains. Accordingly, if they are accidentally coupled together in the brakes, it becomes necessary, with some little expenditure in time and trouble, to uncouple said cars.

By means of this electro-pneumatic control and operating system wherein the cylinders, piping and valves are all located right at the brakes, there will result considerable economy in air, afford a more prompt and accurate control of the car movements, and the piping will be far less extensive and less complicated. With the straight air system heretofore used any pressures can be obtained in the brake cylinders from 20 lbs. to a maximum of 105 lbs., but it requires a constant adjustment and readjustment of the handles of the straight air valves. Experience with the electro-pneumatic unit, which we have put in service, shows that two, or at most, three pressures will be adequate. The operator will simply throw the master control switch to one of the positions indicated, dependent upon the total weight of the car and its load, and at the proper time he will throw the switch to release position. This greatly conserves the tower operator's time, enabling him also to operate track switches from the tower. Furthermore, by means of this control system for the brakes the latter are given different definite set braking positions with respect to the wheels they are engaging, whereby different definite braking pressures are transmitted to and through the brakes or wheel engaging members 10, 11, 12 and 13 for retarding cars accordingly. As mentioned above, in this particular instance we have illustrated a brake control arrangement whereby the brakes may be applied or set corresponding to two stepped braking pressures of 20 pounds per square inch and 105 pounds per square inch. Of course, it will be understood that instead of having just the two definite set braking positions or pressures, any number of definite set braking positions or pressures may be employed. Also, it will be understood that not only fluid motive power may be used in applying the brakes, but any other motive power devices, such as electrical and various mechanical motive power devices, may be employed for giving the brakes graduated or different definite settings for exerting corresponding braking pressures on the wheels for retarding purposes.

There may be various modifications of the invention herein particularly shown and described and it is our intention to cover all such modifications which do not involve a departure from the spirit and scope of the invention as set forth in the following claims.

We claim:

1. In control mechanism for track brakes, the combination of a fluid pressure cylinder and piston for operating the brakes, fluid pressure connections to opposite ends of said cylinder, control valves in said connections, and means for electrically controlling said valves.

2. In control mechanism for track brakes, the combination of a fluid pressure cylinder and piston for operating said brakes and being located adjacent thereto, fluid pressure connections to opposite ends of said cylinder, control valves in said connections, and remote electrical control means for controlling movement of said valves.

3. In control mechanism for track brakes, the combination of a fluid cylinder and piston for operating the brakes, fluid pressure connections to opposite ends of said cylinder, control valves in said connections, and means for electrically controlling said valves whereby a plurality of different brake pressures may be transmitted to the brakes.

4. In control mechanism for track brakes, the combination of a fluid pressure cylinder and piston for operating the brakes, fluid pressure connections to opposite ends of said cylinder, control valves in said connections, and means for electrically controlling said valves whereby the brakes may be applied at a plurality of different pressures and may be released under full pressure.

5. In control mechanism for track brakes, the combination of a fluid pressure cylinder and piston for operating the brakes, fluid pressure connections to opposite ends of said cylinder, an admission control valve and an exhaust control valve in said connections, and means for simultaneously actuating said valves for operating the brakes.

6. In control mechanism for track brakes, the combination of a fluid pressure cylinder and piston for operating the brakes, fluid pressure connections to opposite ends of said cylinder, an admission control valve and an exhaust control valve in said connections, and means for electrically controlling said valves for opening one and closing the other at the same time.

7. In control mechanism for track brakes, the combination of a fluid pressure cylinder and piston for operating the brakes, fluid pressure connections to opposite ends of said cylinder, a plurality of admission control valves for admitting fluid under different pressures for operating the brakes, and exhaust valve for controlling the exhaust from one end of the cylinder, and selective control means whereby either one or both of said admission valves may be operated and also said exhaust control valve operated.

8. In control mechanism for track brakes, the combination of a fluid cylinder and piston for operating the brakes, fluid pressure connections to opposite ends of said cylinder, two valves for controlling the passage of fluid under different pressures to one end of said cylinder, an exhaust control valve for controlling the exhaust from the other end of said cylinder, another valve for controlling a fluid supply to the second end of said cylinder, an exhaust valve for controlling exhaust from the first end of said cylinder, and means for controlling the movements of said valves.

9. In control mechanism for track brakes, the combination of a fluid pressure cylinder and piston for operating the brakes, fluid pressure connections to opposite ends of said cylinder, two valves for controlling the passage of fluid under different pressures to one end of said cylinder, an exhaust control valve for controlling the exhaust from the other end of said cylinder, another valve for controlling a fluid supply to the second end of said cylinder, an exhaust valve for controlling exhaust from the first end of said cylinder, and remote electrical control means for controlling the movements of said valves.

10. A car retarding device for railroads comprising braking means for engaging the car wheels, power means for actuating the breaking means, and multiple circuit remote control means for governing said power means to cause the braking means to engage the car wheels with any one of a plurality of predetermined pressures.

11. In control mechanism for track brakes which may exert a plurality of different braking pressures, means for electrically controlling the exertion of graduated braking pressures through said brakes.

12. A track brake for railroads comprising brake members engaging opposite faces of the car wheel, springs acting on said braking members, and remote controlled power means for exerting a predetermined variable pressure against said springs and thereby cause the brake members to press against the car wheels with a corresponding predetermined variable pressure.

13. In combination, track brakes, fluid pressure means whereby different braking pressures may be exerted through said track brakes, and means for electrically controlling said fluid pressure means for controlling the exertion of graduated braking pressures through said brakes.

14. Track brake apparatus for railroads comprising in combination with a pair of track rails, a series of independently movable braking elements along each side of each track rail, springs acting on said braking elements, an air cylinder and piston operable to exert pressure on said springs and cause said braking elements to exert a corresponding pressure on the car wheels, and remote controlled means for producing in said air cylinder any one of a plurality of predetermined pressures.

15. In control mechanism for track brakes which may be moved in accordance with varying braking requirements, means for electrically controlling the setting of the track brakes in a graduated manner to cause definite braking pressures to be exerted through said track brakes.

16. In combination, track brakes, means whereby said track brakes may be moved in accordance with varying braking requirements, and means for electrically controlling the setting of the track brakes in a garduated manner to cause definite braking pressures to be exerted through said track brakes.

17. Track brake apparatus for railroads comprising in combination with a pair of track rails, a series of independently movable braking elements along each side of each track rail, springs acting on said braking elements, an air cylinder and piston operable to exert pressure on said springs and cause said braking elements to exert a corresponding pressure on the car wheels, and remote control means including a controlling handle manually movable to different set positions for producing and maintaining in said air cylinder a definite pressure corresponding to the position of said controlling handle.

18. In control mechanism for track brakes which may be moved in accordance with varying braking conditions, means for electrically controlling a stepped movement of said brakes whereby graduated braking pressures may be exerted through said brakes.

19. Track brake apparatus for railroads comprising in combination with a pair of track rails, a series of independently movable braking elements along each side of each track rail, springs acting on said braking elements, an air cylinder and piston operable to exert pressure on said springs and cause said braking elements to exert a corresponding pressure on the car wheels, a local supply of fluid pressure, a local control device, and a controlling handle at a remote point manually movable to any one of a plurality of set positions, said control device being electrically connected to said handle and operating automatically to produce in the air cylinder a predetermined pressure derived from said source and corresponding to the position of said controlling handle.

20. In control mechanism for track brakes which may be moved in accordance with varying braking requirements, means for positioning the track brakes in a graduated manner for exerting different braking pressures and for releasing the brakes with one fluid pressure.

21. In combination, track brakes, motive power means whereby said track brakes may be moved in accordance with varying braking requirements, and means for controlling the positioning of said track brakes in a graduated manner for exerting different braking pressures.

22. In combination, track brakes, fluid pressure means whereby said track brakes may be moved in accordance with varying braking requirements, and means for controlling said fluid pressure means for controlling the positioning of said track brakes in a graduated manner for exerting different braking pressures.

23. In combination, track brakes, fluid pressure means whereby said track brakes may be moved in accordance with varying braking requirements, and means for electrically controlling said fluid pressure means for controlling the positioning of said track brakes in a graduated manner for exerting different braking pressures.

24. In a track brake apparatus for railroads, the combination with a track rail, of braking elements arranged to engage opposite faces of a car wheel on said rail, and power means controlled from a distant point for pressing said brake members toward each other with any one of a plurality of different predetermined pressures.

25. In a power track brake apparatus for railroads, brake elements arranged to engage opposite faces of a car wheel, yieldable means acting on said brake elements, and power means controlled from a distant point for moving said brake elements toward each other to any one of a plurality of different predetermined relative positions and thereby causing said yieldable means to press said brake elements against the car wheel with a pre-selected variable pressure.

26. Track brake apparatus for railroads comprising, retarding means arranged to engage opposite sides of the car wheels, yieldable means acting on said retarding means, power actuated means for actuating said retarding means through said yieldable means, a local source of power for said power means, and control means governed from a distant point for controlling the application of power from the local source of said power means.

27. Track brake apparatus for railroads comprising, braking elements engaging opposite sides of car wheels, springs for pressing said braking elements against the car wheels, and power means controllable from a distant point for applying a variable force to said yieldable means, whereby said braking elements may be pressed against the car wheels with a pre-selected variable pressure.

28. Track brake apparatus for railroads comprising, in combination with a track rail, brake elements on each side of the track rail arranged to engage opposite faces of a car wheel thereon, yieldable means associated with each braking element, and power means controllable from a distant point for exerting a predetermined variable pressure against said yieldable means.

29. Track brake apparatus for railroads comprising, braking members engaging opposite faces of the car wheel, springs associated with said members, force-transmitting means acting on said springs, and power means controllable from a distant point for shifting said force-transmitting means to any one of a plurality of different predetermined positions.

30. Car retarding apparatus for railroads comprising braking elements arranged to engage wheels of the car, power means for acting upon said braking elements with a yieldable pressure, and remote control means for governing the supply of power from said source to said power means and permitting the application and release of power to apply or release a variable predetermined pressure to said braking elements.

31. Track brake apparatus for railroads comprising braking elements for engaging the sides of car wheels, and remote controlled power means for moving said braking elements toward the car wheels with a predetermined variable pressure and away from the car wheels with one fixed pressure.

32. Track brake apparatus for railroads comprising braking elements for engaging the sides of car wheels, and remote controlled power means for moving said braking elements toward the car wheels with a predetermined variable pressure and away from the car wheels with full pressure.

33. A track brake comprising a braking element movable transversely with respect to the track rail to engage the side of the car wheel, a member movable transversely of the track, springs between said member and said braking element, and remote controlled power means for operating said member to and holding it in a position to exert any one of a plurality of predetermined pressures on a car wheel through said springs.

Signed at Chicago, Illinois, this 15th day of December, 1924.

GEORGE HANNAUER.
EDGAR M. WILCOX.